(12) United States Patent
Chun et al.

(10) Patent No.: US 10,439,519 B2
(45) Date of Patent: Oct. 8, 2019

(54) METHOD AND APPARATUS FOR ENERGY CONVERSION USING MICROFLUIDIC CHANNEL ARRAY WITH HIERARCHICAL STRUCTURE

(71) Applicant: KOREA INSTITUTE OF SCIENCE AND TECHNOLOGY, Seoul (KR)

(72) Inventors: Myung-Suk Chun, Seoul (KR); Byoungjin Chun, Seoul (KR); Ji-Young Lee, Seoul (KR); Heesoo Jeon, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 95 days.

(21) Appl. No.: 15/803,708

(22) Filed: Nov. 3, 2017

(65) Prior Publication Data
US 2019/0115854 A1    Apr. 18, 2019

(30) Foreign Application Priority Data
Oct. 13, 2017  (KR) .......................... 10-2017-0133245

(51) Int. Cl.
*H02N 1/00* (2006.01)
*H02N 3/00* (2006.01)
*H02N 1/08* (2006.01)

(52) U.S. Cl.
CPC ................. *H02N 3/00* (2013.01); *H02N 1/08* (2013.01)

(58) Field of Classification Search
CPC ........ H02N 3/00; H02K 1/274; H02K 1/2766; H02K 2213/03

USPC ......................................................... 310/309
See application file for complete search history.

(56) References Cited

U.S. PATENT DOCUMENTS

| | | | | |
|---|---|---|---|---|
| 2,695,367 A | * | 11/1954 | Dijck | H02N 3/00 310/308 |
| 4,223,241 A | * | 9/1980 | Paszyc | H02N 1/10 310/308 |
| 6,361,892 B1 | * | 3/2002 | Ruhl | H01M 8/025 429/443 |

(Continued)

FOREIGN PATENT DOCUMENTS

KR    10-1050141 B1    7/2011

OTHER PUBLICATIONS

Wouter Olthuis et al., "Energy from streaming current and potential", Sensors and Actuators B, 2005, pp. 385-389, Nov. 11, 2005.

(Continued)

*Primary Examiner* — Yuriy Semenenko
(74) *Attorney, Agent, or Firm* — Rabin & Berdo, P.C.

(57) ABSTRACT

Disclosed herein is a method and an apparatus using microfluidic channel array for converting mechanical energy into electric energy by streaming potential and streaming current caused when the electrolyte liquid flows in a charged surface due to a pressure drop. The present invention relates to a method and an apparatus for designing channels with hierarchical structure in which a primary multi-channel is provided by radially arranging one or more unit channels, and each of the unit channels includes an inflow channel, an outflow channel, and a secondary multi-channel provided by arranging one or more channels in parallel, thereby improving output power and flow stability.

17 Claims, 10 Drawing Sheets

(56) References Cited

U.S. PATENT DOCUMENTS

| | | | | |
|---|---|---|---|---|
| 7,709,126 | B2* | 5/2010 | Chun | H01M 14/00 |
| | | | | 204/600 |
| 10,079,393 | B1* | 9/2018 | Verma | B22F 7/02 |
| 2006/0083661 | A1* | 4/2006 | Chun | H02N 3/00 |
| | | | | 422/504 |
| 2007/0105032 | A1* | 5/2007 | Yokota | G03G 5/047 |
| | | | | 430/59.5 |

OTHER PUBLICATIONS

Abraham Mansouri et al., "High-power electrokinetic energy conversion in a glass microchannel array", Lab Chip, 2012, 12, pp. 4033-4036, Sep. 3, 2012.

\* cited by examiner

METHOD AND APPARATUS FOR ENERGY CONVERSION USING MICROFLUIDIC CHANNEL ARRAY WITH HIERARCHICAL STRUCTURE

CROSS REFERENCE TO RELATED APPLICATION(S)

This application claims the benefit of Korean Patent Application No. 10-2017-0133245, filed Oct. 13, 2017, which is hereby incorporated by reference in its entirety into this application.

BACKGROUND OF THE INVENTION

1. Technical Field

The present invention relates generally to a technique for energy conversion using a hierarchical structure, in which a primary multi-channel includes one or more unit channels radially arranged and the unit channel includes an inflow channel, an outflow channel, and a secondary multi-channel having one or more channels arranged in parallel, according to a technique for converting mechanical energy into electric energy to generate streaming potential and streaming current when liquid is allowed to flow through the microfluidic channel with charged wall by applying pressure drop, based on an electrokinetic principle that causes an electric field and a flow field to be combined. The present invention improves output power and flow stability, so that it may be applied to nano locomotion, MEMS devices operation, ubiquitous power supply, and self-power harvesting by human body.

2. Description of the Related Art

An electrokinetic phenomenon is caused due to an interaction of a charged solid surface with a liquid containing electrolyte ions, in which there are electro-osmosis and electrophoresis in which liquids or particles dispersed in the liquid move when an electric field is applied thereto, and, vice versa, a streaming potential in which an electric field is generated when liquids move. Compared to the electro-osmosis and electrophoresis that have greatly contributed to the progress of analytical science and technology over the last 100 years, the streaming potential has started to receive attention in a possible application as an emergent energy conversion and harvesting technology, thus microscale liquid flow has recently become a field of active study.

For example, Olthuis et al. [W. Olthuis, B. Schippers, J. Eijkel, A. van den Berg, "Energy from streaming current and potential", Sensors and Actuators B, 111-112, 385-389, 2005] reported a streaming potential, a streaming current, and energy conversion results obtained using porous glass filter with a pore size in a range of 1.0 to 1.6 μm for different external resistances. Mansouri et al. [A. Mansouri, S. Bhattacharjee and L. Kostiuk, "High-power electrokinetic energy conversion in a glass microchannel array", Lab Chip, 12, 4033-4036, 2012] proposed a channel network in which both ends of a porous glass filter were coated with a gold foil having a thickness of a nanometer level to allow it to function as an electrode. They proved the practical feasibility of an apparatus for energy conversion based on electrokinetic effects by generating output power above 1 mW.

Further, Chun et al. [M.-S. Chun, M. S. Shim, D. K. Choi, "Electrokinetic Micro Power Cell Using Pile-Up Disk Type Microfluidic-Chip with Multi-Channel", U.S. Pat. No. 7,709,126, May 4, 2010] invented a micro power cell by stacking one or more disk type microfluidic-chips made of polydimethylsiloxane (PDMS) material, in which multi-channels were formed by a micro-electromechanical system (MEMS) process to improve output power and to realize uniform flow distribution. Subsequently, Myung-Suk Chun ["Silicon microfluidic-chip with parallel multi-channel and micro/nano energy system using the chip", Korean Patent No. 10-1050141, Jul. 12, 2011] invented an energy system capable of achieving enhanced energy according to an external resistance, by composing multiple unit cells in which disk type microfluidic-chips made of silicon material having higher charged property than PDMS are stacked.

The electrokinetic principle in which a streaming potential and a streaming current are generated is as follows. When a channel wall is charged, counter-ions having an opposite sign to the charge of the channel wall are gathered near the wall due to movements of electrolyte ions dissolved in a liquid to form an electric double layer and electrostatic potential distribution. Herein, a thickness of the electric double layer is a measure of electrostatic interaction and is inversely proportional to a square root of a concentration of all ions dissolved in the liquid. That is, in a case of distilled-deionized water having an extremely low ion concentration of $10^{-7}$ mol, the electric double layer has the maximum thickness of about 1 μm and therefore the wall surface is strongly charged. On the other hand, as the ion concentration increases, the electric double layer becomes thin and therefore the wall surface becomes weakly charged. Another measure of the electrostatic interaction is surface potential which is defined as an electrostatic potential at the wall. The larger the surface potential value, the stronger the charged property of the wall surface. The surface potential value can be regarded as a zeta potential value experimentally measured, which changes according to pH (or, the negative of the logarithm of a hydrogen ion concentration).

When the incompressible liquid of viscosity μ flows into the channel with a charged wall surface at a velocity of u by a pressure gradient ($\nabla p$) between both ends of the channel, a flow field in a steady state is represented by Equation 1 below.

$$\nabla p = \mu \nabla^2 u + \rho_e \nabla \phi \qquad \text{[Equation 1]}$$

Here, a velocity of liquid in a square channel having a width W, a height H, and a length L exists only in an axial direction $u_z$. $\rho_e \nabla \phi$ is the external force due to movements of ions and defined as a product of a net charge density $\rho_e$ of co-ions and counter-ions per unit volume in the electric double layer formed near the channel wall and a gradient $\nabla \phi$ ($=\Delta \phi / L$) of the streaming potential $\Delta \phi$ formed by movements of the counter ions.

More specifically, in the electric double layer composed of a fixed layer and a diffuse layer, when the counter-ions in the diffuse layer having an opposite sign to the charge of the channel wall move toward a downstream end of the channel, a streaming current Is is generated along both ends of the channel in a direction of the liquid flow.

The potential gradient due to ionic charges accumulated on a downstream end of the channel builds an electric field and thus generates a streaming potential, and simultaneously the electric field generates a conduction current $I_c$ along the fixed layer of the electric double layer in a direction opposite to the liquid flow.

Any ion transports in the channel can be divided into a transport by a pressure gradient and a transport by a potential gradient, which can be quantified by the Nernst-Planck equation. Since the net current consisting of streaming current and conduction current is conserved inside the channel at steady state, it is represented by a relation of $I_s + I_c = 0$, whereby the streaming potential $\Delta \phi$ can be finally obtained by the following Equation 2.

$$\Delta \phi = \frac{LI_s}{2(W+H)\lambda_s + \int \sum_i \frac{\Lambda_i^2 e^2 N_A}{kT} D_i n_i dA} \qquad \text{[Equation 2]}$$

Here, $\lambda_s$ is a surface conductivity in the channel wall, $N_A$ is Avogadro's number, $D_i$ is a diffusion coefficient of ion i, k is Boltzmann constant, $\Lambda_i$ is a valence of ion i, e is a unit charge, and $n_i$ is the number concentration (1/m$^3$) of ion i dissolved in the liquid.

DOCUMENTS OF RELATED ART (Patent document 1) M.-S. Chun, M. S. Shim, D. K. Choi, "Electrokinetic Micro Power Cell Using Pile-Up Disk Type Microfluidic-Chip with Multi-Channel", U.S. Pat. No. 7,709,126, May 4, 2010.

(Patent document 2) Myung-Suk Chun, "Silicon microfluidic-chip with parallel multi-channel and micro/nano energy system using the chip", Korean Patent No. 10-1050141, Jul. 12, 2011.

(Non-patent document 1) W. Olthuis, B. Schippers, J. Eijkel, A. van den Berg, "Energy from streaming current and potential", Sensors and Actuators B, 111-112, 385-389, 2005.

(Non-patent document 2) A. Mansouri, S. Bhattacharjee, L. Kostiuk, "High-power electrokinetic energy conversion in a glass microchannel array", Lab Chip, 12, 4033-4036, 2012.

SUMMARY OF THE INVENTION

Accordingly, the present invention has been made keeping in mind the above problems occurring in the prior art, and an object of the present invention is to provide a method and an apparatus for energy conversion capable of improving the maximum output power compared to the existing art by increasing degree of channel integration using a microfluidic channel array with hierarchical structure and achieving stable flow by uniform flow distribution without flowing backward in all channels, according to a technique in which mechanical energy is converted into electric energy to generate a streaming potential and a streaming current by an electrokinetic principle. The present invention allows microfluidic-chips including channels to be fabricated by using a MEMS process and a microfabrication technique.

In order to accomplish the above object, the present invention provides an apparatus and a method for energy conversion using microfluidic channel array with hierarchical structure, in which a primary multi-channel is provided by radially arranging one or more unit channels, and the unit channel includes an inflow channel and an outflow channel; and a secondary multi-channel provided by arranging one or more channels vertically in parallel between the inflow channel and the outflow channel, thereby generating electric energy by liquid flow in microfluidic channels.

The maximum streaming potential and the maximum streaming current are determined from a graph between a streaming potential $\Delta \phi$ and output power $P_{out}$, in which the maximum output power is represented by Equation 3 below.

$$P_{out,max} = (I_{s,max} \Delta \phi_{max})/4 \qquad \text{[Equation 3]}$$

Meanwhile, the input power $P_{in}$ mechanically applied by allowing liquid of volumetric flow rate Q to flow at pressure drop $\Delta p$ corresponds to $\Delta p Q$.

The present invention may improve the maximum output power compared to the existing art by increasing degree of channel integration using a microfluidic channel array with hierarchical structure and implement stable flow by uniform flow distribution without flowing backward in all channels. More specifically, it is possible to achieve a primary enhancement in the streaming current from a primary multi-channel formed by radially arranging one or more unit channels and a secondary enhancement in the streaming current from a secondary multi-channel formed by arranging one or more channels in parallel in each of the unit channels. In addition, the primary multi-channel includes the unit channels arranged at equal intervals, and also the secondary multi-channel formed in each of the unit channels has one or more channels arranged at equal intervals, thereby generating electric energy by stable flow with uniform flow distribution without flowing backward in all channels.

In the unit channel, both widths of inflow channel and outflow channel are larger than a width of the channels forming the secondary multi-channel so that a pressure increase by increase of flow rate is easily relieved, thereby increasing a streaming current can be attained by increasing the flow rate. Although there is a disadvantage in that the thickness of an electric double layer formed near a channel wall relevant to generating the streaming current is very small compared to the widths of inflow channel and outflow channel, this is compensated by the secondary multi-channel including one or more channels with small channel width arranged in parallel. Therefore, if a unit channel composed of the inflow channel, the outflow channel, and the secondary multi-channel is properly designed, it is possible to implement a chip capable of improving power density with an optimal channel space.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
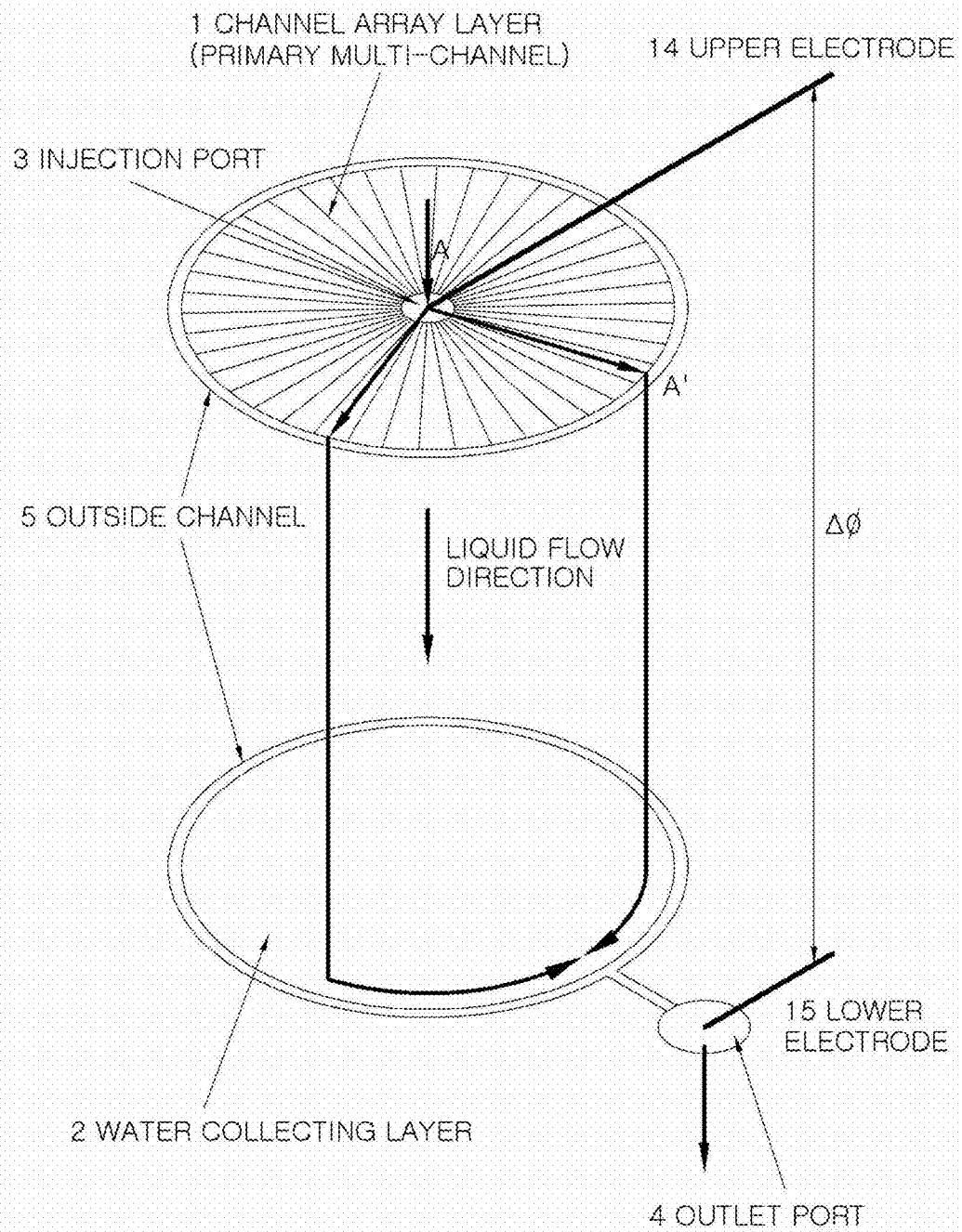
FIG. 1 shows a design diagram of an upper substrate serving as a channel array layer having radial multi-channel formed thereon and a lower substrate serving as a water collecting layer, and illustrates a liquid flow direction.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

The present invention provides an energy conversion method using electrokinetic streaming potential and streaming current caused due to liquid flows in microfluidic channels with hierarchical structure in which a primary multi-channel is provided by radially arranging one or more unit channels, and the unit channel includes an inflow channel and an outflow channel; and a secondary multi-channel provided by arranging one or more channels in parallel, and an apparatus for energy conversion having the microfluidic channels.

More specifically, the present invention relates to an apparatus for energy conversion with the hierarchical structure in which a primary multi-channel is provided by radially arranging one or more unit channels around an inlet port toward an outside channel and the unit channel includes an inflow channel and an outflow channel; and a secondary multi-channel provided by arranging one or more channels vertically at equal intervals between the inflow channel and the outflow channel, and the apparatus for energy conversion includes microfluidic-chip. One or more unit channels in the primary multi-channel and one or more channels in the secondary multi-channel are arranged at equal intervals in order to achieve uniform flow distribution in all channels.

The apparatus for energy conversion is provided by connecting an upper substrate of a channel array layer including the inlet port, the unit channels, and the outside channel formed thereon; to a lower substrate of a water collecting layer including an outside channel and an outlet port formed thereon. The microfluidic channels with the hierarchical structure are provided as shown in FIGS. 1 to 4.

Referring to FIG. 1 showing a design diagram of an upper substrate serving as a channel array layer having radial multi-channel formed thereon and a lower substrate serving as a water collecting layer, when liquid is injected into the inlet port located at a center of the upper substrate, the liquid is transported through one or more unit channels, is collected in the outside channel, and then is discharged to the outlet port provided on the lower substrate. An upper electrode and a lower electrode are positioned in the inlet port and the outlet port, respectively, and connected to a source meter, whereby a streaming potential and a streaming current generated by liquid flow are measured while the liquid is being injected and discharged.

Figure 2:
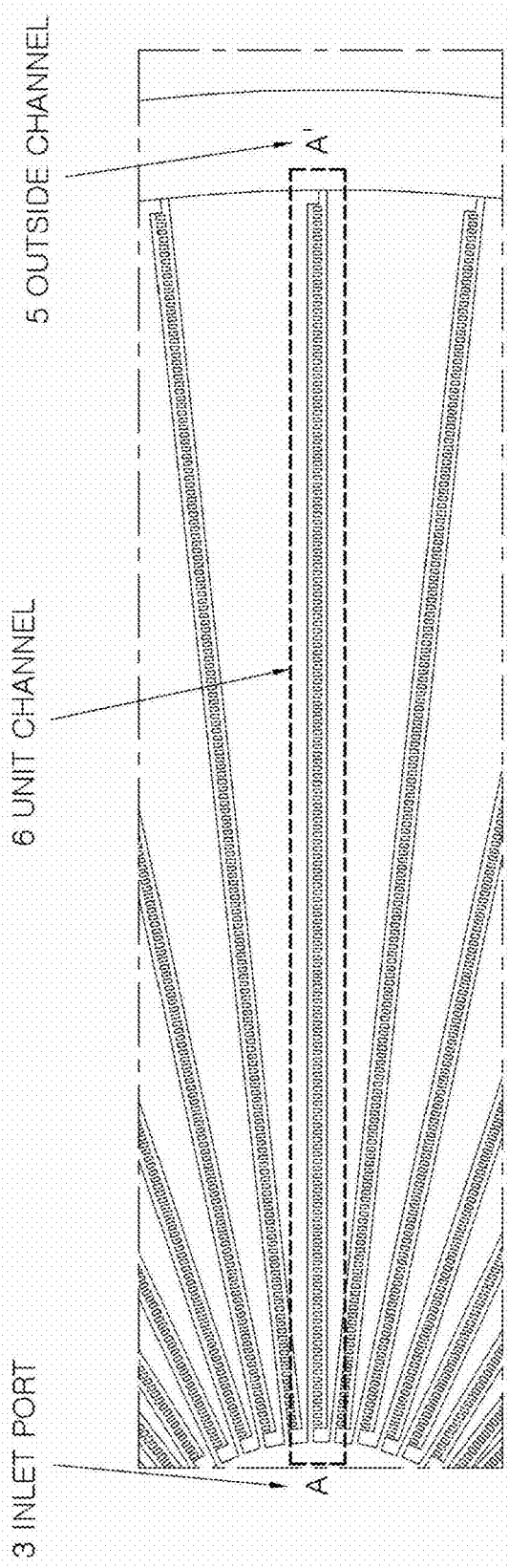
FIG. 2 shows a design view of a unit channel radially arranged in the channel array layer.
Figure 3:
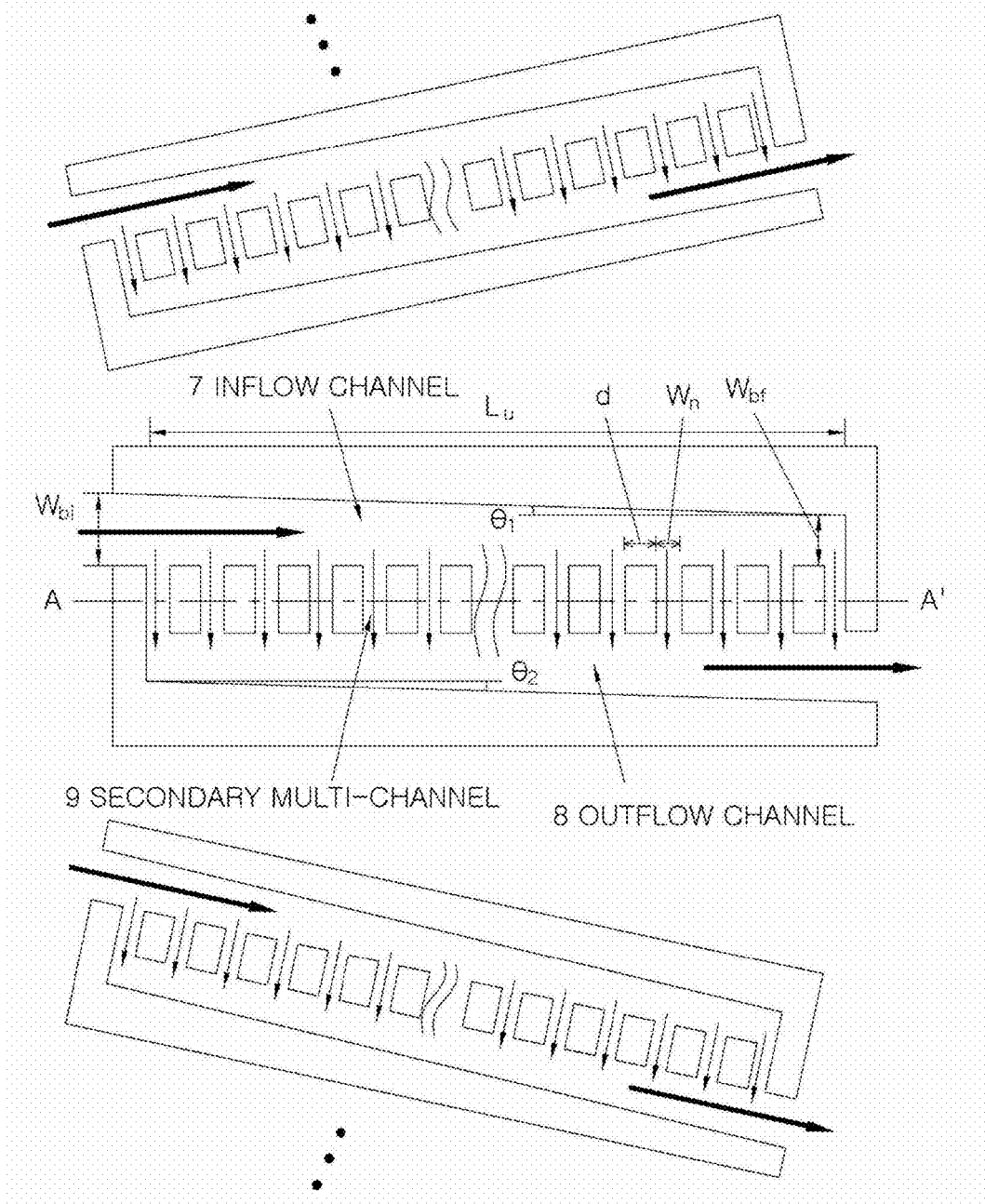
FIG. 3 shows a detailed design view for a line A-A' of the unit channel, in which the unit channel is composed of an inflow channel, an outflow channel having a trapezoidal shape, and a secondary multi-channel.
Figure 4:
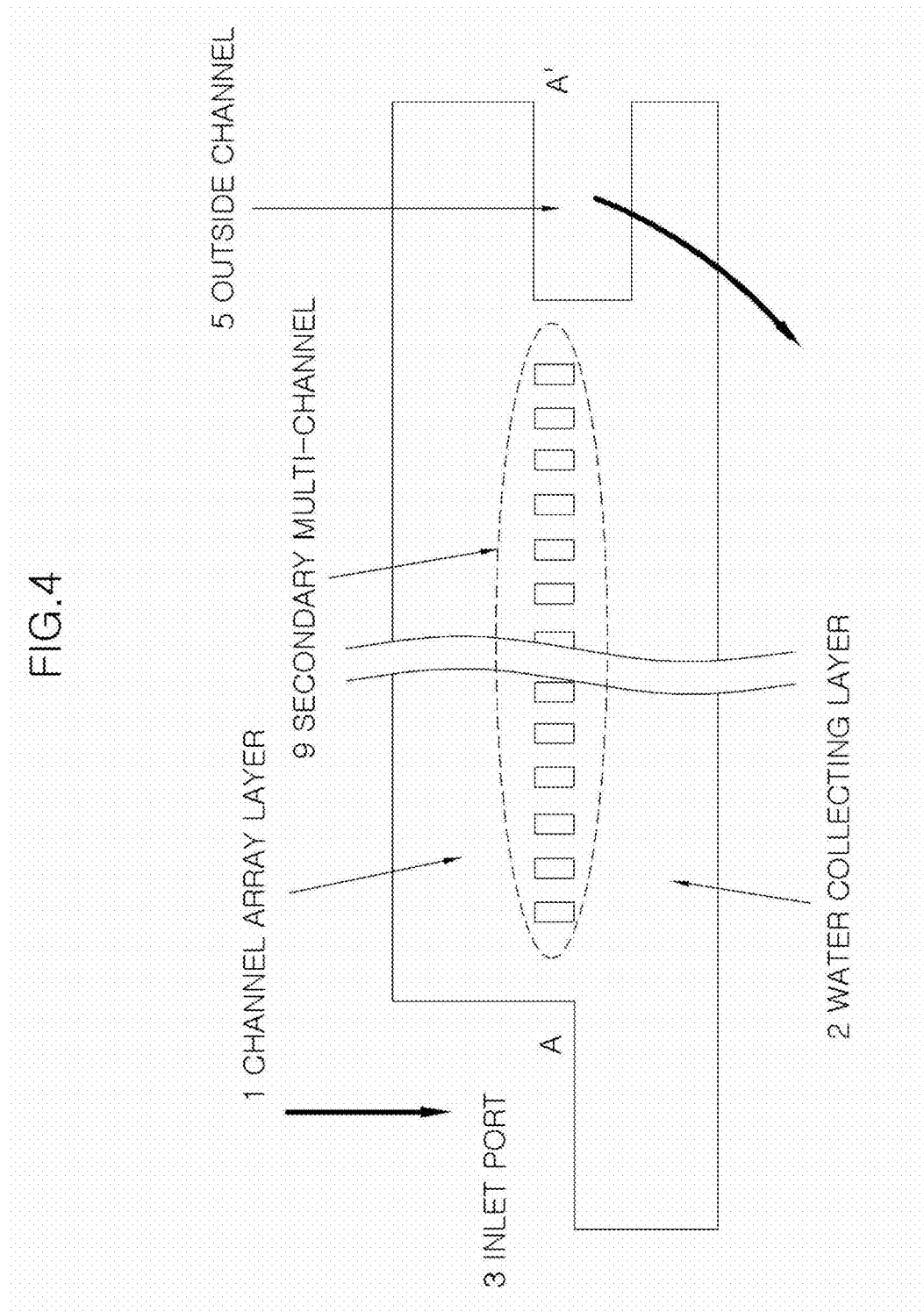
FIG. 4 is an exploded sectional view taken along the line A-A' of the unit channel from a side, and illustrates a secondary multi-channel, an inlet port, and an outside channel.

The radial multi-channel of FIG. 1 is provided by arranging one or more unit channels in parallel as shown in FIG. 2. Referring to FIG. 3 showing a detailed design view of a line A-A' of the unit channel and FIG. 4 showing an exploded sectional view taken from a side, the unit channel is composed of an inflow channel and an outflow channel; and a secondary multi-channel.

In the unit channel of FIG. 3, the inflow channel and the outflow channel are preferably designed to take a trapezoidal shape. That is, liquid injected from the inlet port into the inflow channel is distributed to the secondary multi-channel having one or more channels arranged in parallel, and at this time it is preferable that a width of the inflow channel gradually decreases as the inflow channel travels away from a center of the upper substrate, on which the inlet port is located. On the other hand, the liquid transporting through the secondary multi-channel is collected at the outflow channel, and it is preferable that a width of the outflow channel gradually increases as the outflow channel approaches the position where the outside channel is located. The reason is to maintain a constant pressure gradient from the inlet port to the outside channel in order to eliminate the backflow.

It is preferable that the decreasing rate in the inflow channel width is set to cause an inclination angle $\theta_1$ to be 0 to 10 degrees, based on the maximum width $W_{bi}$ and the minimum width $W_{bf}$ of the inflow channel. Here, the inclination angle is $\theta_1 = \arctan[(W_{bi}-W_{bf})/L_u]$ when a length of the inflow channel is $L_u$. Similarly, the increasing rate in the outflow channel width is set to cause an inclination angle $\theta_2$ to be 0 to 10 degrees, based on the maximum width and the minimum width of the outflow channel. Here, although the inclination angle $\theta_1$ which is the decreasing rate in the inflow channel width and the inclination angle $\theta_2$ which is the increasing rate in the outflow channel width may be the same or different from each other to be symmetric or asymmetric, they are preferably designed symmetrically such as $\theta_1=\theta_2$.

According to the present invention, each width of the inflow channel and the outflow channel is formed to be 10 μm to 100 μm, preferably 20 μm to 50 μm, at each midpoint of the inflow channel and the outflow channel (i.e., a point of $L_u/2$). A width $W_n$ of each channel forming the secondary multi-channel is 1/50 to 1/10 of the inflow channel width and the outflow channel width. Preferably, the inflow channel, the outflow channel, and the secondary multi-channel have all the same height in a range of 1 to 5 times of the corresponding channel widths for easy fabrication of the channel, but the present invention is not limited thereto. An inter-channel distance d in the secondary multi-channel is 1.2 times or more of the channel width $W_n$ for easy fabrication of the chip.

A length of the unit channel is formed to be 500 μm to 1 cm, preferably 1 mm to 5 mm. In the upper substrate having the radial multi-channel formed thereon, the number of the unit channels is 20 to 200, preferably 50 to 150. In addition, it is preferable that the outside channel is designed to have a width of 200 μm to 1 mm for the purpose of smooth outflow of liquid without additional pressure drop.

Figure 5:
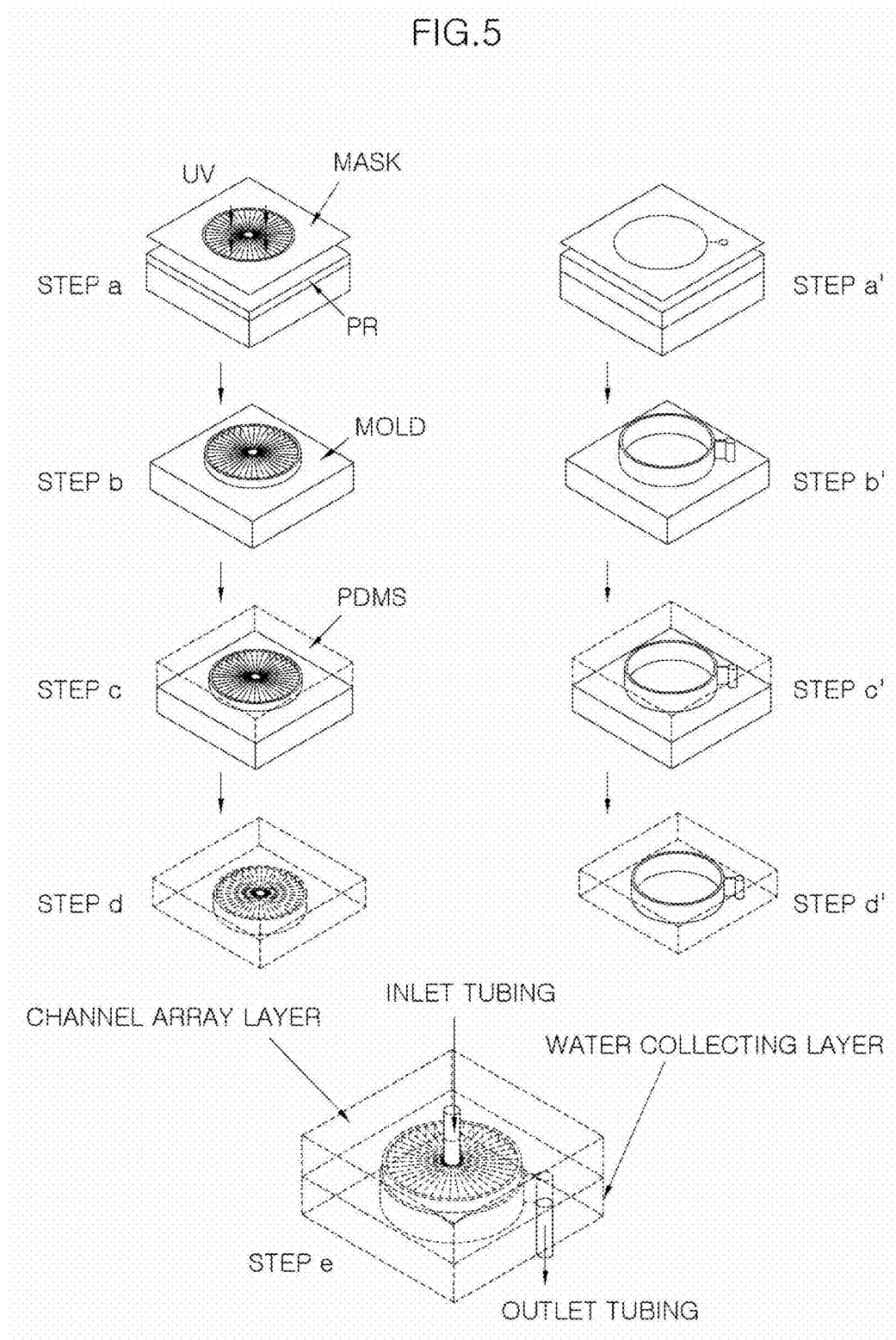
FIG. 5 is a diagram illustrating a fabrication process of a microfluidic-chip according to the present invention, in which a and a' are patterning processes by mask and UV exposure, b and b' are forming processes of master molds by a photoresist (PR), c and c' are curing processes of PDMS, d and d' are PDMS replicas peeled from the molds, and e is a bonding process between an upper substrate and a lower substrate.

The microfluidic-chip according to the present invention is composed of an upper substrate and a lower substrate. The upper substrate includes unit channels radially arranged with a predetermined height from a bottom surface thereof, an inlet port, and an outside channel; and a lower substrate includes an outlet port and an outside channel. As shown in FIG. 5, a microfluidic-chip is fabricated according to a well-known MEMS process using polydimethylsiloxane (PDMS) that is a transparent plastic.

The inlet port and the outlet port have a pair of electrode tubing made of copper (Cu) having a length of 2 cm inserted thereto, and inlet tubing and outlet tubing of a plastic material having an outer diameter of 1/16 inch are connected to a pair of electrode tubing rolled as an upper electrode and a lower electrode, respectively. Accordingly, the streaming potential and the streaming current are measured simultaneously while the liquid is being injected and discharged, without providing extra electrodes. Although the present invention uses the electrode tubing of copper material, the electrode tubing may be used with any one or more of the conductive metals selected from a group including, but not limited to, gold (Au), silver (Ag), platinum (Pt), and a combination thereof.

[Embodiment]

A microfluidic-chip was fabricated, in which the number of unit channels radially arranged to form a primary multi-channel was 58 and one unit channel was composed of an inflow channel, an outflow channel, and a secondary multi-channel provided by arranging 170 channels in parallel between the inflow channel and the outflow channel. Each of 170 channels was designed to have a length of 60 μm, a height of 50 μm, a width of 20 μm, and an inter-channel distance of 30 μm. As described above, the inflow channel and the outflow channel take a trapezoidal shape in which the width of each channel gradually changes. In this embodiment, the difference between the maximum width and the minimum width was 20 μm and the width of the outside channel was 700 μm.

Figure 6:
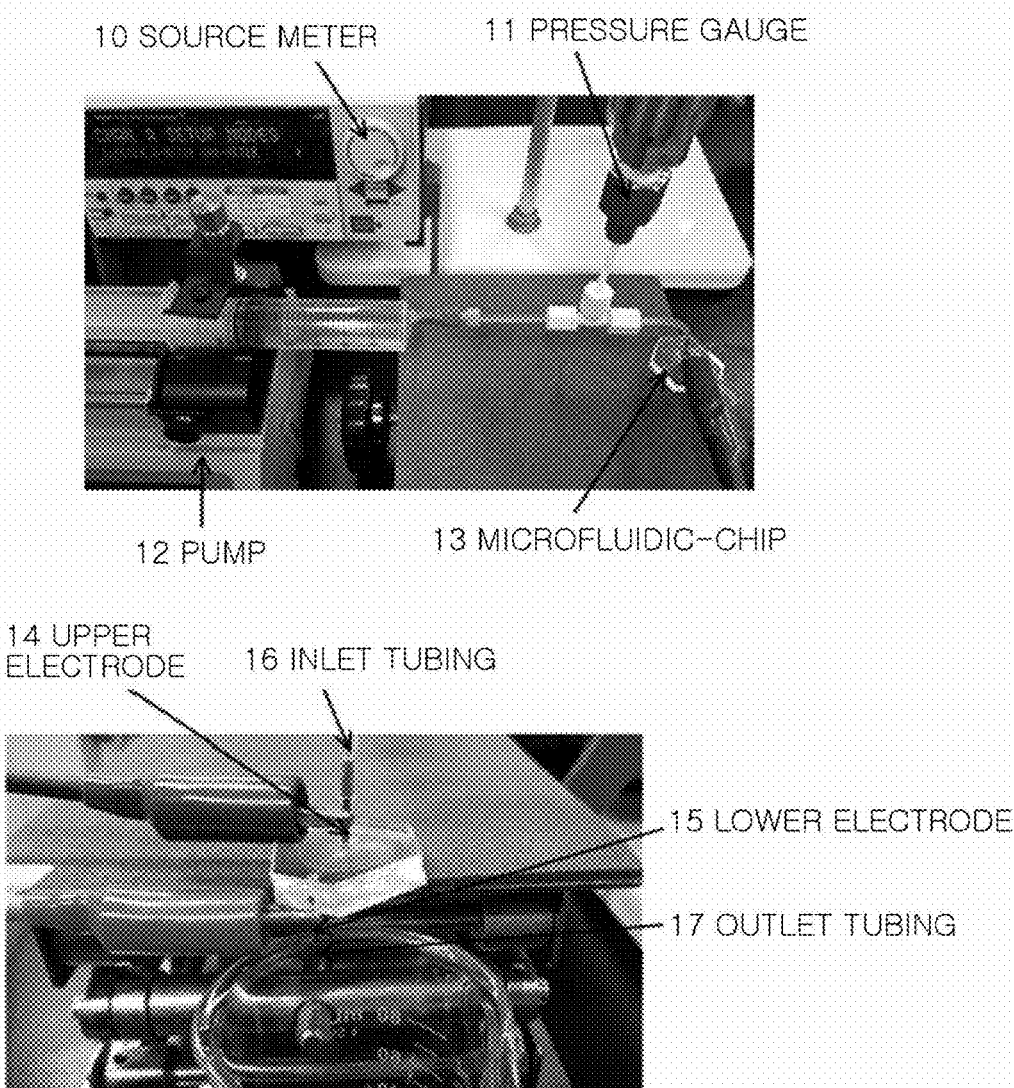
FIG. 6 shows an experimental apparatus for measuring a streaming current-streaming potential generated by a chip fabricated according to the present invention.

The fabricated microfluidic-chip was mounted to develop the apparatus for energy conversion as shown in FIG. 6. When electrolyte liquid with KCl concentration of 0.01 mM was fed to an inlet port of the chip by a pump, the electrolyte liquid was transported through the inflow channel, the secondary multi-channel, and the outflow channel in each of the unit channels forming the radial multi-channel, and then was discharged to an outlet port. A pressure drop $\Delta p$ between both ends of the channel was precisely measured by a pressure gauge, and streaming potential $\Delta \phi$ and streaming current $I_s$ between both ends of the channel were measured by a digital source meter (2635 A, Keithley) through the Cu electrode tubing positioned in inlet port and outlet port, respectively. A volumetric flow rate, a streaming potential and a streaming current were measured with variations of the pressure drop between both ends of the channel.

Figure 7:
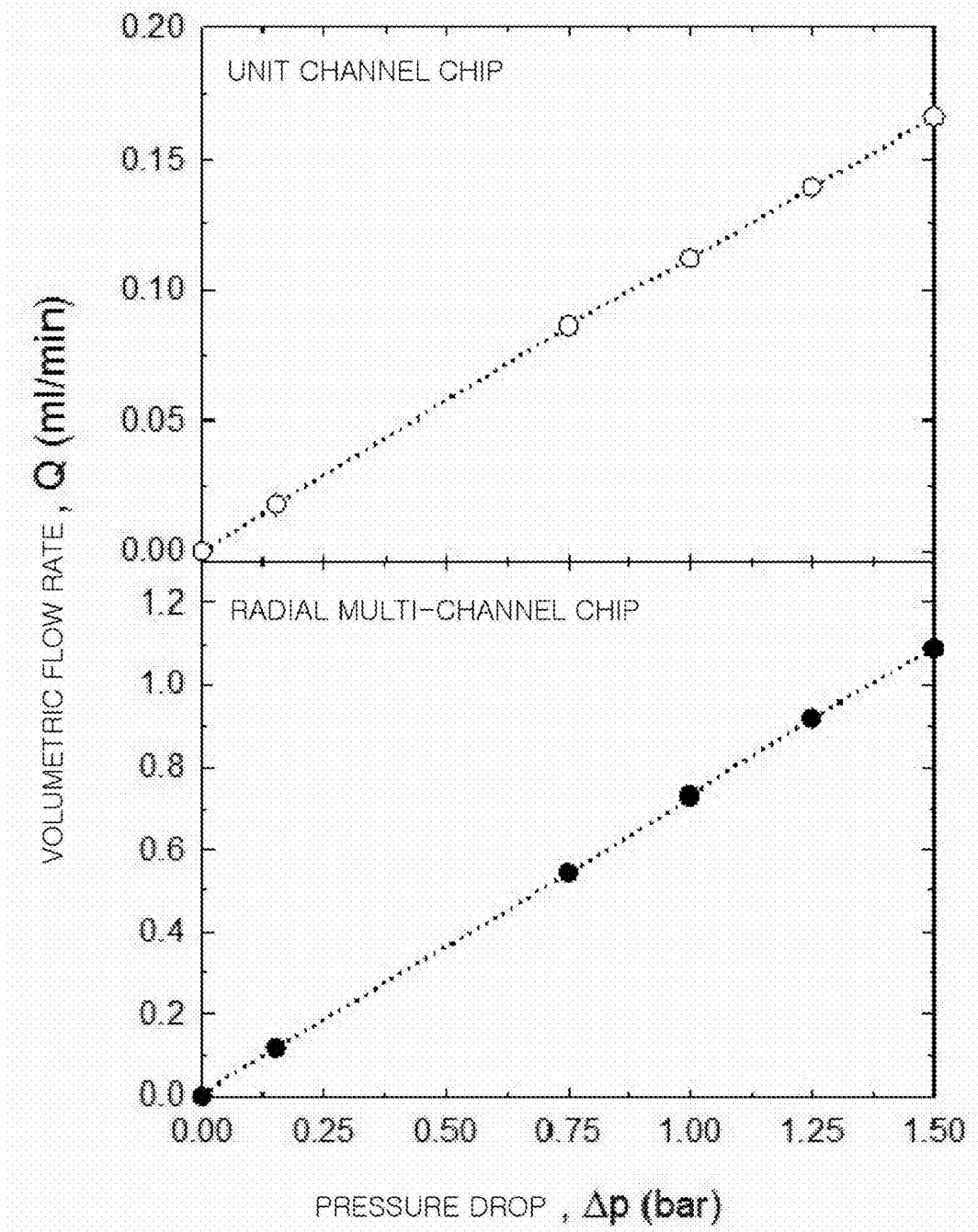
FIG. 7 shows a graph comparing variations of volumetric flow rates with respect to the applied pressure drop between a unit channel chip and a radial multi-channel chip.
Figure 8:
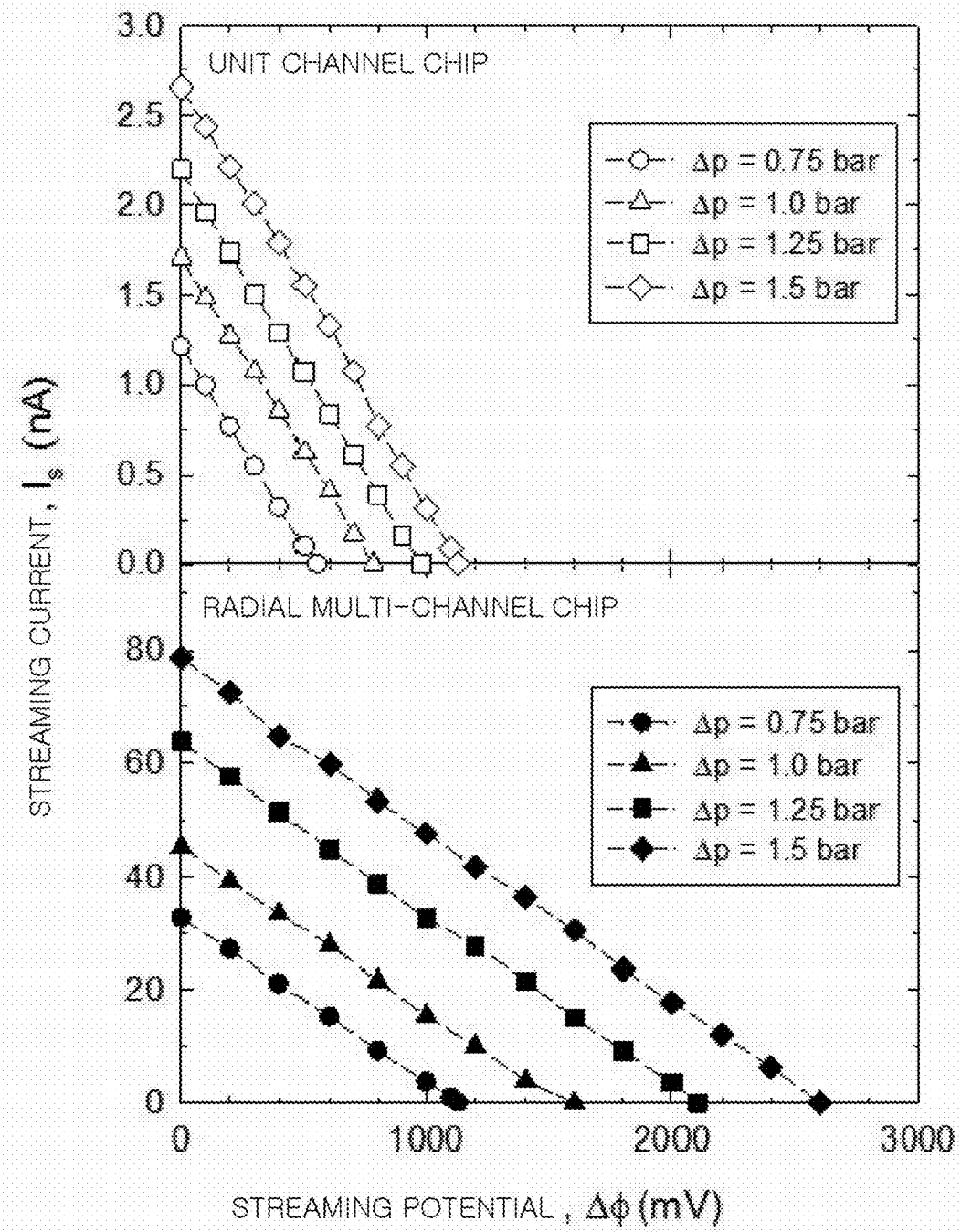
FIG. 8 shows a graph comparing measurements of streaming potential-streaming current with respect with the applied pressure drop between a unit channel chip and a radial multi-channel chip.

As a result of experiments shown in FIG. 7, the volumetric flow rate shows a linear increase with respect to an increase of pressure drop, wherein the flow rate is evenly distributed into each unit channel from the fact that the flow rate in the radial multi-channel chip increases in proportion to the number of unit channels at the same pressure drop. The streaming current corresponds to a current when a voltage is zero in a short circuit, and the streaming potential corresponds to a voltage when a current is zero in an open circuit. Referring to FIG. 8 showing the streaming potential-streaming current with respect to the applied pressure drop, the output power $P_{out}$ can be plotted with respect to the streaming potential, as shown in FIG. 9.

Figure 9:
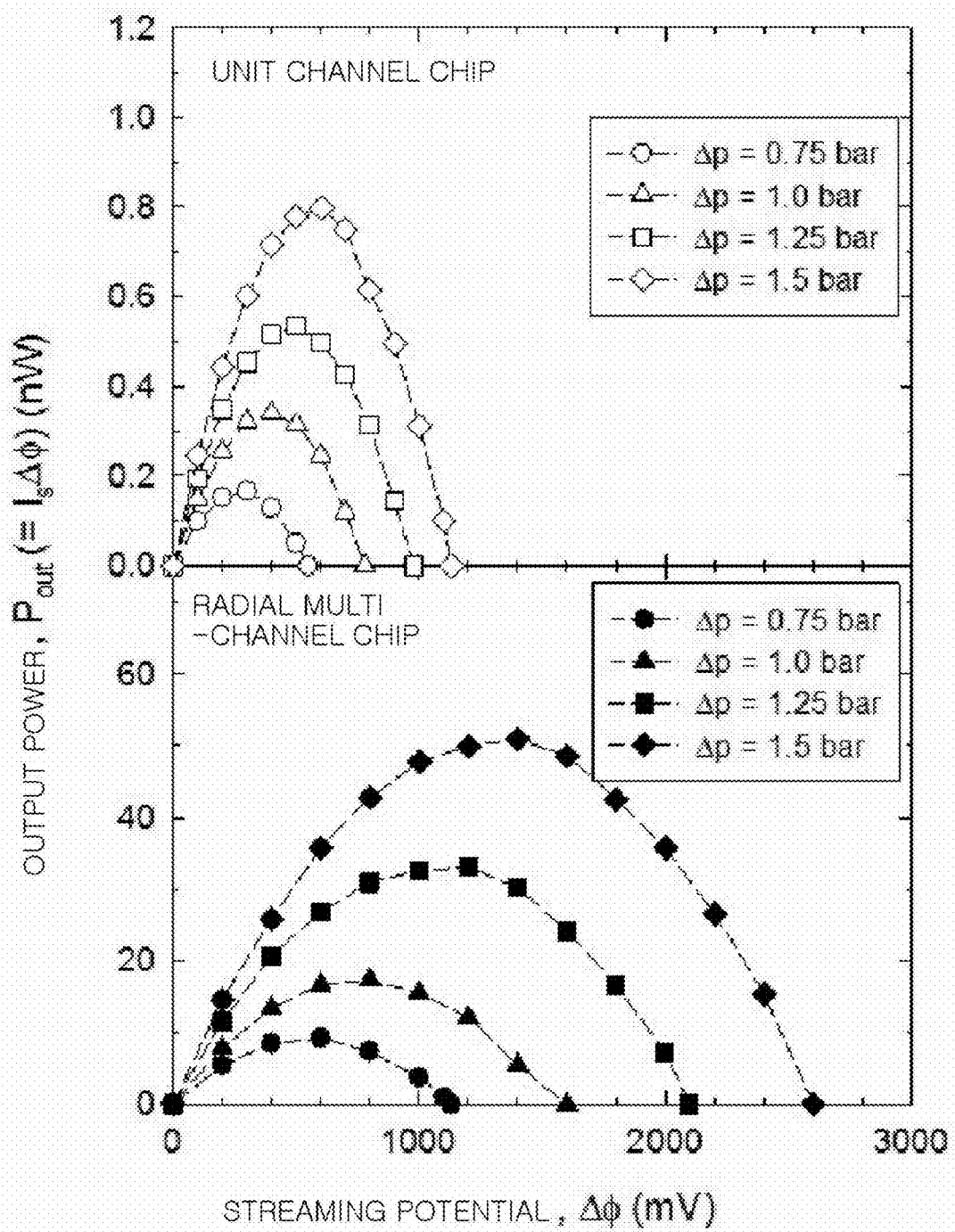
FIG. 9 shows a graph comparing the streaming potential-output power with respect to the applied pressure drop between a unit channel chip and a radial multi-channel chip.
Figure 10:
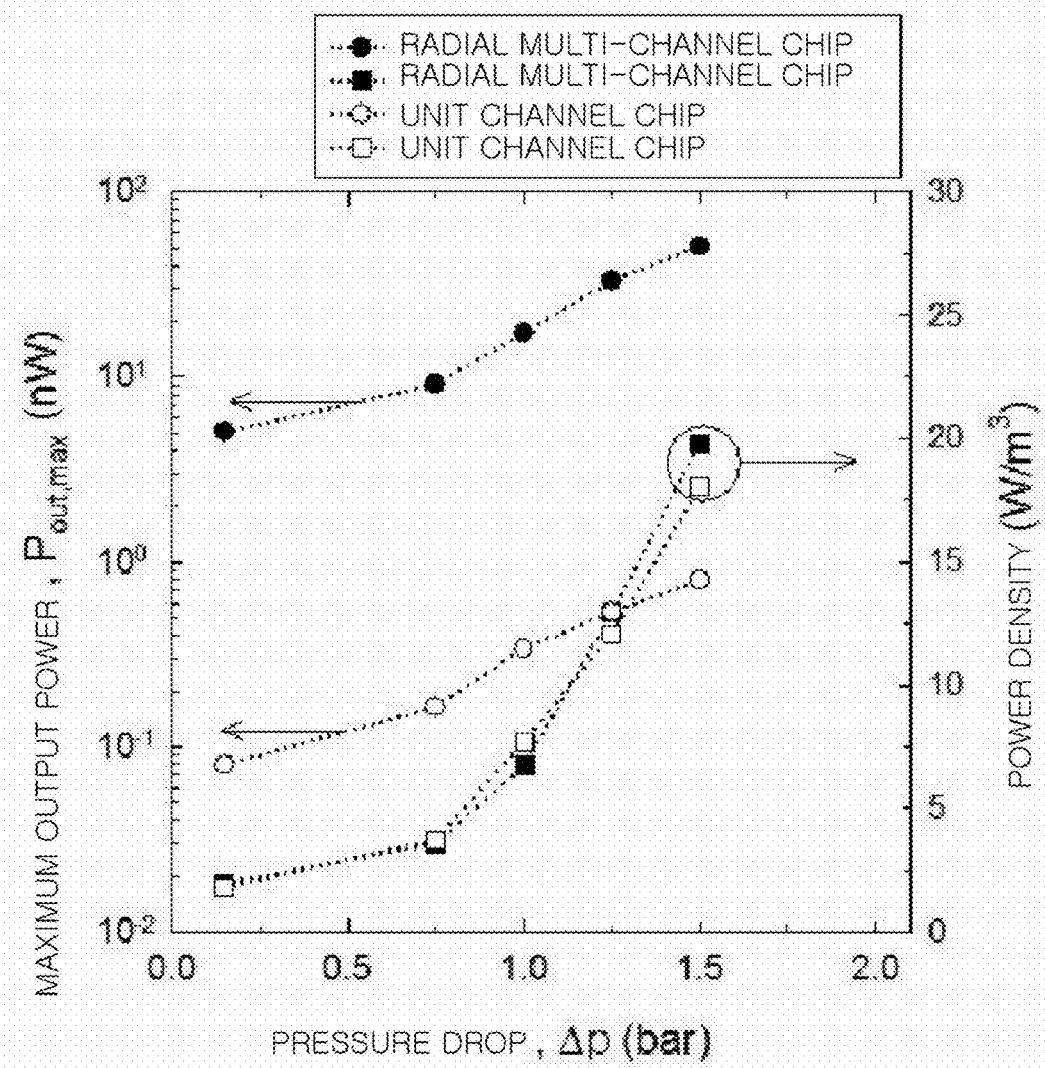
FIG. 10 shows a graph comparing the maximum output power and the power density with respect to the applied pressure drop between a unit channel chip and a radial multi-channel chip.

Referring to a curve of FIG. 9, the maximum streaming potential and the maximum streaming current can be determined, from which the maximum output power $P_{out, max}$ and power density are obtained, as shown in FIG. 10. The power density is defined as the value of maximum output power generated per a volume of all channel spaces through which liquid flows, which is a measure representing energy conversion performance of the microfluidic-chip devised in the present invention. From a result of FIG. 10, as the pressure drop increases, the maximum output power and the power density increase. The maximum output power in the radial multi-channel chip slightly increases higher compared to the number of unit channels, and the power density in the radial multi-channel chip is nearly similar to that of the unit channel and tends to slightly increase with increasing pressure drop.

As described above, method and apparatus for generating streaming potential and streaming current based on the electrokinetic principle according to the present invention may improve the maximum output power and secure flow stability using the microfluidic channel array with hierarchical structure.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

DESCRIPTION OF THE REFERENCE NUMERALS IN THE DRAWINGS

1: channel array layer (primary multi-channel)
2: water collecting layer
3: inlet port
4: outlet port
5: outside channel
6: unit channel
7: inflow channel
8: outflow channel
9: secondary multi-channel
10: source meter
11: pressure gauge
12: pump
13: microfluidic-chip
14: upper substrate
15: lower substrate
16: inlet tubing
17: outlet tubing

What is claimed is:

1. An apparatus for energy conversion including microfluidic channels with hierarchical structure, the apparatus comprising:

a primary multi-channel provided by radially arranging one or more unit channels around an inlet port towards an outside channel;

wherein each of the unit channels includes an inflow channel, an outflow channel, and a secondary multi-channel provided by arranging one or more channels vertically in parallel between the inflow channel and the outflow channel, wherein the apparatus is provided by connecting an upper substrate of a channel array layer including the inlet port, the radial multi-channel, and the outside channel formed thereon to a lower substrate of a water collecting layer including the outside channel and an outlet port formed thereon, wherein the inflow channel and the outflow channel are provided to take a trapezoidal shape so as to achieve uniform flow distribution and prevent backflow, whereby a width of the inflow channel gradually decreases as the inflow channel travels away from the inlet port, and a width of the outflow channel gradually increases as the outflow channel approaches the outside channel, and wherein the decreasing rate in the width of the inflow channel is set to cause an inclination angle $\theta_1$ to be 0 to 10 degrees based on a maximum width $W_{bi}$ and a minimum width $W_{bf}$ of the inflow channel, and the increasing rate in the width of the outflow channel is set to cause an inclination angle $\theta_2$ to be 0 to 10 degrees based on a maximum width and a minimum width of the outflow channel.

2. The apparatus for energy conversion of claim 1, wherein the inclination angle $\theta_1$ of the decreasing rate in the width of the inflow channel and the inclination angle $\theta_2$ of the increasing rate in the width of the outflow channel are the same or different from each other to be symmetric or asymmetric.

3. The apparatus for energy conversion of claim 1, wherein the width of the inflow channel and the width of the outflow channel are set to be 10 μm to 100 μm at a midpoint ($L_u/2$) in the inflow channel and the outflow channel, and a width $W_n$ of each channel forming the secondary multi-channel is 1/50 to 1/10 of the width of the inflow channel and the width of the outflow channel.

4. The apparatus for energy conversion of claim 1, wherein the inflow channel, the outflow channel, and the secondary multi-channel have all the same height in a range of 1 to 5 times of the width of the inflow channel, the outflow channel, and the secondary multi-channel, respectively.

5. The apparatus for energy conversion of claim 1, wherein an inter-channel distance d in the secondary multi-channel is 1.2 times or more of a width $W_n$ of the channels.

6. The apparatus for energy conversion of claim 1, wherein a length of the unit channel is set to be 500 μm to 1 cm, and the number of the unit channels in the upper substrate having the radial multi-channel formed thereon is 20 to 200.

7. The apparatus for energy conversion of claim 1, wherein the upper substrate and the lower substrate are each provided with the outside channel so that liquid transporting through the unit channel is collected and then discharged.

8. The apparatus for energy conversion of claim 1, further comprising:

a pair of electrode tubing served as an upper electrode and a lower electrode and inserted into the inlet port and the outlet port, respectively; and an inlet tubing and an outlet tubing of a non-conductive plastic material connected to the upper electrode and the lower electrode, respectively.

9. The apparatus for energy conversion of claim 1, wherein a streaming potential, a streaming current, or both of the streaming potential and the streaming current are measured simultaneously while liquid is being injected and discharged.

10. The apparatus for energy conversion of claim 1, wherein the apparatus enables a primary enhancement in a streaming current from the primary multi-channel and a secondary enhancement in a streaming current from the secondary multi-channel.

11. The apparatus for energy conversion of claim 1, wherein the primary multi-channel is provided by radially arranging the unit channels at equal intervals and the secondary multi-channel formed in each of the unit channels is provided by arranging one or more channels at equal intervals, thereby achieving stable flow by uniform flow distribution without flowing backward in all the channels.

12. An apparatus for energy conversion including microfluidic channels, the apparatus comprising:

an upper substrate including
an inlet port,
an upper part of an outside channel grooved on the upper substrate around the inlet port, and
one or more primary channels radially arranged around the inlet port on the upper substrate, wherein each of the primary channels includes an inflow channel open to the inlet port, an outflow channel open to the upper part of the outside channel, and multiple secondary channels arranged in parallel between the inflow channel and the outflow channel; and a lower substrate including
a lower part of the outside channel grooved on the lower substrate, wherein the lower part of the outside channel is configured to form the outside channel along with the upper part of the outside channel, and
an outlet port formed on the lower substrate to communicate with the outside channel;

wherein when the upper substrate and the lower substrate are coupled together, the inlet port is open to a top side of the upper substrate and the outlet port is open to a bottom side of the lower substrate.

13. The apparatus for energy conversion of claim 12, wherein the inflow channel and the outflow channel have a trapezoidal shape such that a width of the inflow channel gradually decreases as the inflow channel travels away from the inlet port, and a width of the outflow channel gradually increases as the outflow channel approaches the outside channel.

14. The apparatus for energy conversion of claim 13, wherein the decreasing rate in the width of the inflow channel is set to cause an inclination angle $\theta_1$ to be 0 to 10 degrees based on a maximum width $W_{bi}$ and a minimum width $W_{bf}$ of the inflow channel, and the increasing rate in the width of the outflow channel is set to cause an inclination angle $\theta_2$ to be 0 to 10 degrees based on a maximum width and a minimum width of the outflow channel.

15. The apparatus for energy conversion of claim 13, wherein the width of the inflow channel and the width of the outflow channel are set to be 10 μm to 100 μm at a midpoint ($L_u/2$) in the inflow channel and the outflow channel, and a width $W_n$ of each channel forming the secondary channels is 1/50 to 1/10 of the width of the inflow channel and the width of the outflow channel.

16. The apparatus for energy conversion of claim 13, wherein the inflow channel, the outflow channel, and the multiple secondary channels have all the same height in a range of 1 to 5 times of the width of the inflow channel, the outflow channel, and the multiple secondary channels, respectively.

17. The apparatus for energy conversion of claim 12, further comprising:

an upper electrode and a lower electrode inserted into the inlet port and the outlet port, respectively; and an inlet tubing and an outlet tubing connected to the upper electrode and the lower electrode, respectively.

* * * * *